United States Patent
Lawliss et al.

(10) Patent No.: US 12,359,998 B2
(45) Date of Patent: Jul. 15, 2025

(54) APPARATUS AND METHOD FOR PARTIALLY BLADED ROTOR TEST

(71) Applicant: RTX Corporation, Farmington, CT (US)

(72) Inventors: Nicholas J. Lawliss, West Hartford, CT (US); Zhiqiang Wang, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/238,196

(22) Filed: Aug. 25, 2023

(65) Prior Publication Data
US 2025/0067613 A1   Feb. 27, 2025

(51) Int. Cl.
*G01M 1/12* (2006.01)
*F01D 5/16* (2006.01)
*G01M 15/14* (2006.01)

(52) U.S. Cl.
CPC ............... *G01M 1/122* (2013.01); *F01D 5/16* (2013.01); *G01M 15/14* (2013.01); *F05D 2230/60* (2013.01); *F05D 2260/96* (2013.01)

(58) Field of Classification Search
CPC ........ G01M 1/122; G01M 1/12; G01M 1/125; G01M 1/34; G01M 1/36; G01M 15/14; F01D 5/16; F01D 5/3015; F01D 5/027; F01D 5/3007; F01D 25/04; F01D 25/06; F01D 5/30; F05D 2230/60; F05D 2260/96
See application file for complete search history.

(56) References Cited

U.S. PATENT DOCUMENTS

| 2006/0133938 A1* | 6/2006 | Ellis | F01D 5/027 416/144 |
| 2024/0110483 A1* | 4/2024 | Harrison | G01M 1/36 |

FOREIGN PATENT DOCUMENTS

| CN | 109339868 A | * | 2/2019 | F01D 5/02 |
| CN | 113495002 A | * | 10/2021 | |
| CN | 215865771 U | | 2/2022 | |
| CN | 115203765 A | * | 10/2022 | G01M 15/02 |
| EP | 4345248 A1 | | 4/2024 | |
| FR | 3056629 A1 | * | 3/2018 | F01D 5/027 |
| KR | 20210158657 A | * | 12/2021 | F01D 5/186 |
| WO | 2021148743 A1 | | 7/2021 | |

OTHER PUBLICATIONS

Henry, Georges et al., "Element D'ESSAI Pour Modeliser Une Aube Ou Une Pale D'un Rotor, Rotor Comportant ledit element D'essai" Machine Translation, FR 1659314, EPO, Mar. 30, 2018 (Year: 2018).*

(Continued)

*Primary Examiner* — Woody A Lee, Jr.
*Assistant Examiner* — Joshua R Beebe
(74) *Attorney, Agent, or Firm* — CANTOR COLBURN LLP

(57) ABSTRACT

A counter weight for use with a rotor module, including: a root portion; a main body portion that extends away from the root portion; a pair of side portions each extending from opposite sides of the main body portion; and at least one plate secured to one of the opposite sides of the main body portion in order to adjust a weight of the counter weight.

20 Claims, 5 Drawing Sheets

(56) References Cited

OTHER PUBLICATIONS

Shen, XiGang, et al. "A Design Method Of Counterweight Block for Low Cycle Fatigue Test of Aero-engine Rotor" CN 115203765 A, CPO, Oct. 18, 2022 (Year: 2022).*
Tang, Zhen-nan et al., "Rotation Impact Test Device of Non-full-ring Fan Blade of Aircraft Engine," CPO, CN 113495002 A, Oct. 12, 2021 (Year: 2021).*
Bae Jin Ho, "Turbine Blade and Gas Turbine Comprising the Same" Machine Translation, Korean Patent Office, KR 20210158657, Dec. 31, 2021 (Year: 2021).*
Zhu, Wang, "A Barrier Coating Turbine Model for Service Condition Simulation Test," CPO, 109339868A, Feb. 15, 2019 (Year: 2019).*
Office Action; EP Application No. 24 196 186.1; Date of mailing: Dec. 5, 2024; 3 pages.
European Search Report for EP Application No. 24196186.1; Issue Date, Mar. 10, 2025, 15 pages.

* cited by examiner

APPARATUS AND METHOD FOR PARTIALLY BLADED ROTOR TEST

BACKGROUND

This disclosure relates to gas turbine engines, and more particularly to an apparatus and method for a partially bladed rotor test to render a bladed rotor so that its design can simultaneously reach the goals of a zero offset of mass centroid and symmetrical mass moments of inertia.

Gas turbine engines typically include a fan section, a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades. In addition, the fan section also includes rotating fan blades.

The fan blades, turbine blades and compressor blades, all rotate at high speeds. During the development phase of a new type of blade(s), the availability of the blades is often limited or otherwise expensive. Therefore, when testing the new blades it is desirable to have a partially bladed rotor due to the scarcity of the blades. However, this will result in a rotor with both an offset of mass centroid from its rotational center and an asymmetry of mass moments of inertia along its two principal moment of inertia axes, inducing a potential instability during rotation of the partially bladed rotor during tests.

BRIEF DESCRIPTION

Disclosed is a counter weight for use with a rotor module, including: a root portion: a main body portion that extends away from the root portion; a pair of side portions each extending laterally away from opposite sides of the main body portion; and at least one plate secure to one of the opposite sides of the main body portion in order to adjust a weight of the counter weight.

In addition to one or more of the features described above, or as an alternative to any of the foregoing embodiments, the at least one plate is a pair of plates secured to the opposite sides of the main body portion via bolts that pass through openings in the pair of plates and the main body portion.

In addition to one or more of the features described above, or as an alternative to any of the foregoing embodiments, an edge of the pair of plates contacts a surface of the pair of side portions when they are secured to the main body portion.

In addition to one or more of the features described above, or as an alternative to any of the foregoing embodiments, the root portion, the main body portion and the pair of side portions are all formed as a single unitary item or monolithic structure.

In addition to one or more of the features described above, or as an alternative to any of the foregoing embodiments, an edge of the at least one plate contacts a surface of one of the pair of side portions when it is secured to the main body portion.

In addition to one or more of the features described above, or as an alternative to any of the foregoing embodiments, the pair of side portions extend from an end portion of the main body portion.

Also disclosed is a rotor module, including: a blade cluster of a plurality of blades secured to a rotor disk of the rotor module; and counter weights secured to the rotor disk, wherein a center of gravity of the plurality of blades is zeroed out with respect to an axis "O" of the rotor disk and the rotor module further comprises an "X" axis and a "Y" axis each orthogonally arranged with respect to the axis "O" of the rotor disk and wherein the blade cluster and the counter weights are configured to provide a configuration with respect to the axis "O" of the rotor disk and a moment of inertia Jx about the X axis is equal to a moment of inertia Jy about the Y axis when the rotor module is rotated about the axis "O" of the rotor disk, wherein each counter weight of the counter weights includes: a root portion: a main body portion that extends away from the root portion: a pair of side portions each extending laterally away from opposite sides of the main body portion; and at least one plate secured to one of the opposite sides of the main body portion in order to adjust a weight of the counter weight.

In addition to one or more of the features described above, or as an alternative to any of the foregoing embodiments, the counter weights is a pair of counter weights and the pair of counter weights include a first counter weight group and a second counter weight group.

In addition to one or more of the features described above, or as an alternative to any of the foregoing embodiments, the first counter weight group comprises a pair of counter weights and the second counter weight group comprises a pair of counter weights.

In addition to one or more of the features described above, or as an alternative to any of the foregoing embodiments, the pair of counter weights of the first counter weight group are of different weights and the pair of counter weights and the second counter weight group are of different weights.

In addition to one or more of the features described above, or as an alternative to any of the foregoing embodiments, a center of gravity of the blade cluster is designated at a twelve clock position with respect to the axis "O" and one of the counter weights is at a four clock position with respect to the axis "O" and the another one of the counter weights is at an eight clock position with respect to the axis "O".

In addition to one or more of the features described above, or as an alternative to any of the foregoing embodiments, the counter weights include a first counter weight group and a second counter weight group and the first counter weight group comprises a pair of counter weights and the second counter weight group comprises a pair of counter weights.

In addition to one or more of the features described above, or as an alternative to any of the foregoing embodiments, the plurality of blades are fan blades.

In addition to one or more of the features described above, or as an alternative to any of the foregoing embodiments, the plurality of blades are three fan blades.

In addition to one or more of the features described above, or as an alternative to any of the foregoing embodiments, the at least one plate is a pair of plates secured to opposite sides of the main body portion via bolts that pass through openings in the pair of plates and the main body portion.

In addition to one or more of the features described above, or as an alternative to any of the foregoing embodiments, an edge of the at least one plate contacts a surface of one of the side portions when they are secured to the main body portion.

In addition to one or more of the features described above, or as an alternative to any of the foregoing embodiments, the root portion, the main body portion and the pair of side portions are all formed as a single unitary item or monolithic structure.

In addition to one or more of the features described above, or as an alternative to any of the foregoing embodiments, the pair of side portions includes a sacrificial side portion.

Also disclosed is a method for zeroing out a center of gravity of a plurality of blades with respect to an axis "O" of a rotor disk the plurality of blades are secured to, including: securing a blade cluster of the plurality of blades to the rotor disk; and securing counter weights to the rotor disk, wherein the center of gravity of the plurality of blades is zeroed out with respect to the axis "O" of the rotor disk and the rotor disk further comprises an "X" axis and a "Y" axis each orthogonally arranged with respect to the axis "O" of the rotor disk and wherein the blade cluster and the counter weights are configured to provide a configuration with respect to the axis "O" of the rotor disk and a moment of inertia Jx about the X axis is equal to a moment of inertia Jy about the Y axis when the rotor module is rotated about the axis "O" of the rotor disk, wherein each counter weight of the counter weights includes: a root portion: a main body portion that extends away from the root portion; a pair of side portions each extending laterally away from opposite sides of the main body portion; and at least one plate secured to one of the opposite sides of the main body portion in order to adjust a weight of the counter weight.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
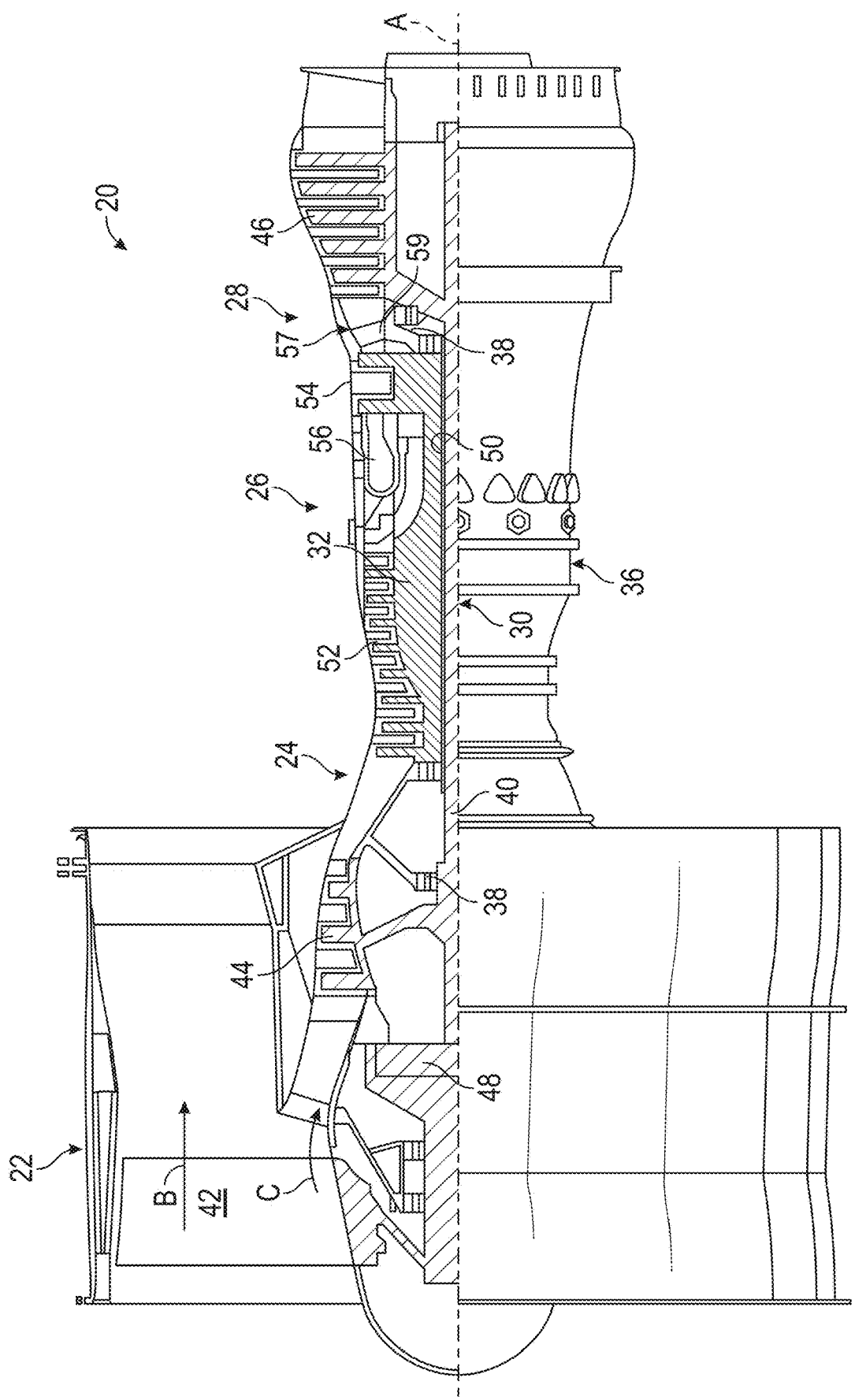
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. It should be understood, however, that the above parameters are only exemplary of one embodiment of a geared architecture engine and that the present disclosure is applicable to other gas turbine engines including direct drive turbofans.

Figure 2:
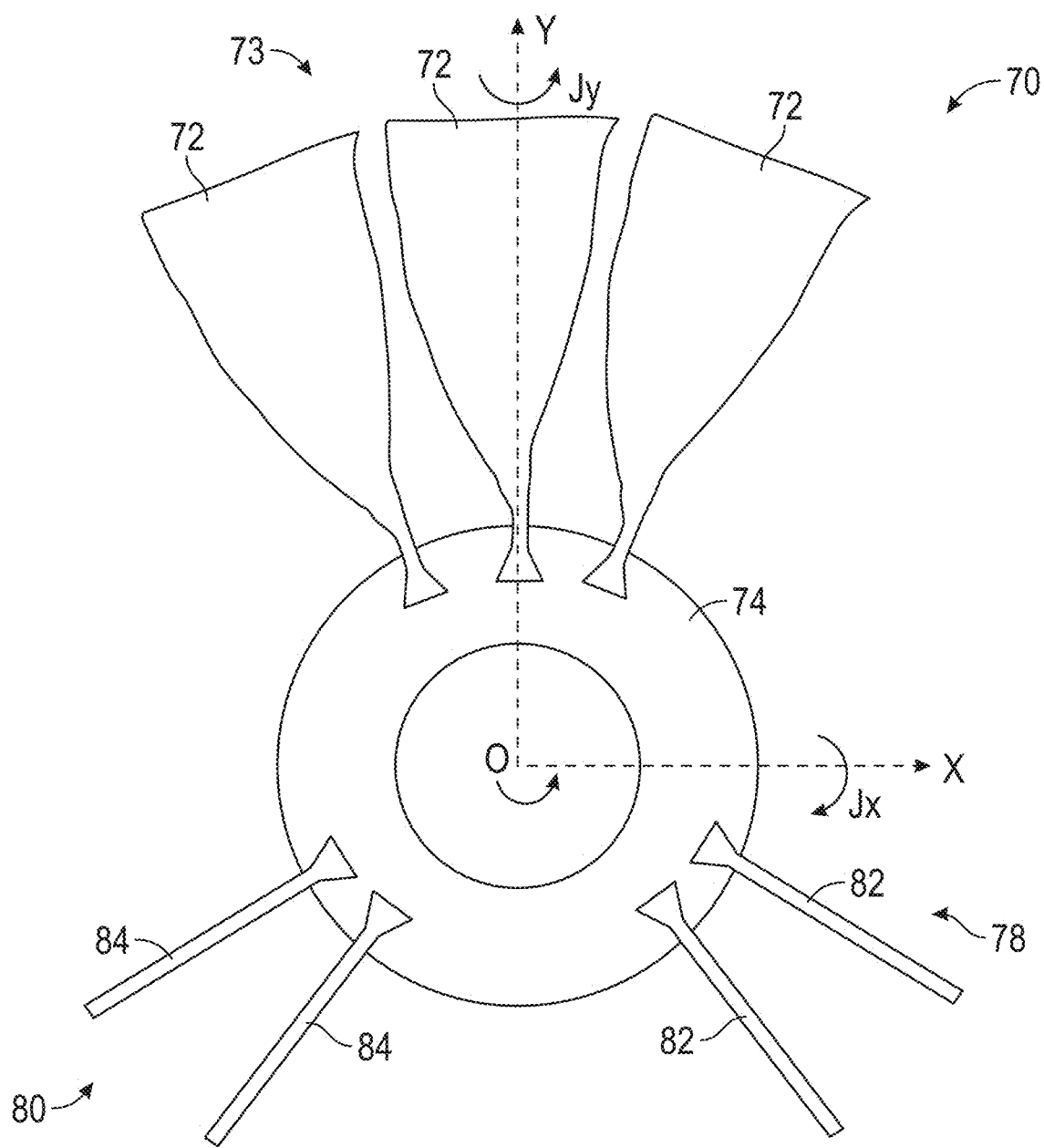
FIG. 2 is an end view of a rotor module with a limited amount of blades and counter weights in accordance with the present disclosure.

FIG. 2 illustrates an end view of an unsymmetrical rotor module 70 with a limited amount of blades, which in the illustrated embodiment may be fan blades 72 of the fan 42. The rotor module 70 includes a rotor or rotor disk 74 to which a plurality of fan blades 72 are secured thereto for testing. The rotor module 70 is configured to be rotated about an axis "O", which may be analogous to axis "A" illustrated in FIG. 1. In FIG. 2 a cluster of blades 73 are secured to the rotor or rotor disk 74. As illustrated, the cluster of blades 73 comprises three fan blades 72. Of course, various embodiments of the present disclosure are not specifically limited to three fan blades 72 as more or less than three blades may be used. In any event and regardless of the amount of blades secured to the rotor or rotor disk 74 there will be a mass imbalance and inertial asymmetry in the bladed rotor or rotor disk 74 unless its entire periphery has fan blades 72 secured to it. However and as mentioned above, when new fan blades 72 are designed and developed the availability of these blades 72 is often limited or otherwise expensive to reproduce. Thus, testing occurs with a limited amount of blades 72 secured to the rotor or rotor disk 74.

As such, there is a non-zero imbalance, which is often very large, and there will be severe vibrations if this configuration is rotated about the axis "O". Accordingly and due to this configuration, a counter weight is required to zero out this imbalance. In addition to the non-zero imbalance, an asymmetry in the mass moments of inertia about the two principal axes also in existence which will generate or increase the rotor dynamic instability during rotation in the subsequent tests. The method and teaching in this disclosure will solve the two issues simultaneously.

The rotor module 70 has a zeroed imbalance by securing pairs of counter weights to the rotor module 70. This may be referred to as a tri-lobe configuration as the fan blades 72 are off-set by the pairs of counter weights. The pairs of counter weights may be referred to as a first counter weight group 78 and a second counter weight group 80. In this configuration, there is no dynamic un-symmetry as the moment of inertia Jx about the X axis is equal to the moment of inertia Jy about the Y axis when this rotor module 70 is rotated about axis "O" with the counter weight configuration illustrated in FIG. 2.

In order to achieve this, a center of gravity of the blade cluster 73 is designated at the twelve clock position when referring to view illustrated in FIG. 2, and the two counter weight clusters, the first counter weight group 78 and the second counter weight group 80 are respectively at the four and eight clock positions when referring to view illustrated in FIG. 2, thus forming a tri-lobe configuration. In other words, the center of gravity of the blade cluster 73, the first counter weight group 78 and the second counter weight group 80 are offset by 120 degrees with respect to each with reference to axis "O". Of course, other configurations are considered to be within the scope of the present disclosure.

Based on this configuration, the counter weights of the first counter weight group 78 and the second counter weight group 80 can be sized to enable a zero nominal imbalance as well as an axi-symmetrical moment of inertia for the partially bladed rotor 74.

Therefore and in this configuration, the undesired vibrations during blade testing are not encountered when this rotor module 70 is rotated about axis "O", which may be analogous to axis "A" illustrated in FIG. 1.

In one embodiment, the first counter weight group 78 may comprise a pair of counter weights 82 and the second counter weight group 80 may comprise a pair of counter weights 84. The counter weights 82 may be secured separately to the rotor disk or rotor 74 or may comprise a single counter weight or the first counter weight group 78 may comprise a pair of counter weights 82 and the second counter weight group 80 may comprise a single counter weight 84. Alternatively, the second counter weight group 80 may comprise a pair of counter weights 82 and the first counter weight group 78 may comprise a single counter weight 84. In one non-limiting embodiment of the present disclosure, the pair of counter weights 82 of the first counter weight group 78 are of different weights and/or sizes and/or lengths and the pair of counter weights 84 of the second counter weight group 80 are of different weights and/or sizes and/or lengths.

While a tri-lobe configuration is illustrated and described above, various embodiments of the present disclosure contemplate numerous configurations of counter weights (e.g., at least two locations or more than two locations each of which may include at least one counter weight or a plurality of counter weights). In addition, the X and Y axes may be orientated at any location with respect to the "O" axis as they rotated about the "O" axis.

Although, FIG. 2 illustrates a rotor module 70 with a limited amount of fan blades 72 and counter weights 76 in accordance with the present disclosure, it is of course, understood that various exemplary embodiments of the present disclosure may be applied to the testing of compressor blades and turbine blades. In other words, the present disclosure is not limited to use with fan blades 72 only.

The apparatus and method of the present disclosure allows a limited amount of blades to be used for rotor tests such as "Bird Strike" or "Containment" tests for fan blades. The apparatus and method enables a zero nominal imbalance for the entire rotor 74 and enables the elimination of the potential instability due to inertia asymmetry.

Figure 3:
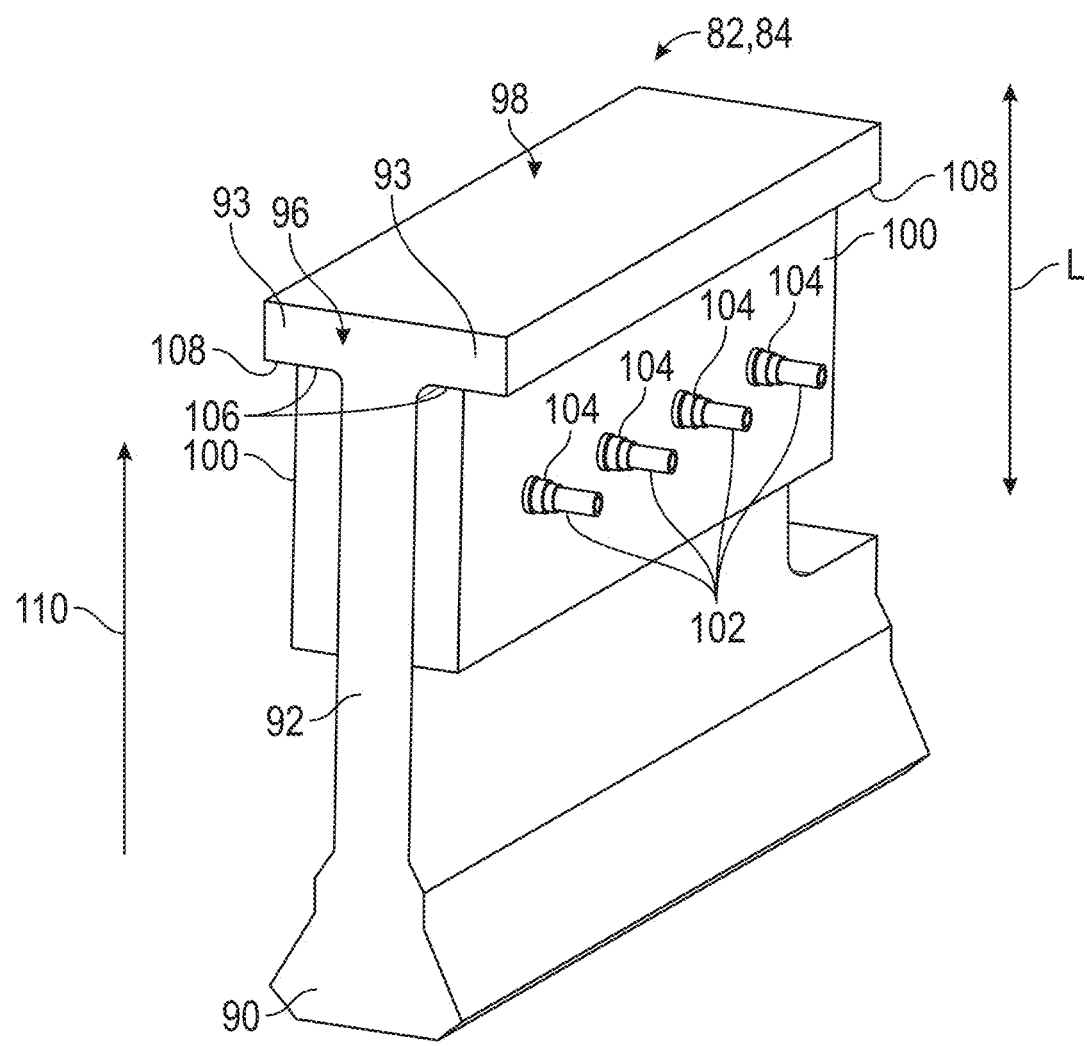
FIG. 3 is a perspective view of a counter weight in accordance with the present disclosure.

Referring now to FIG. 3, a configuration of the counter weights 82, 84 in accordance with the present disclosure is illustrated. Here the counter weights 82, 84 have a root portion 90 configured to slide into a complementary slot of the rotor or rotor disk 74 as is known in the related arts. Extending away from the root portion is a main body portion 92 that extends in a radial direction away from the root portion 90. In one embodiment, a pair of side portions 93 extend laterally away from opposite sides of the main body portion 92. In one embodiment, the pair of side portions 93 and the main body portion 92 terminate in an end portion 96 that extends laterally away from opposite sides of the main body portion 92 such that the counter weight 82, 84 is configured to have a "T" shaped tip portion 98.

In one non-limiting embodiment, the counter weights 82, 84 are formed as a single unitary item wherein the root portion 90, the main body portion 92 and the end portion 96 are all formed as a single unitary item or monolithic structure.

The "T" shaped tip portion 98 allows for plates 100 to be secured to opposite sides of the main body portion 92 in order to adjust the weight of the counter weight 82, 84 as needed in order to provide the zero nominal imbalance as well as the axi-symmetrical moment of inertia for the partially bladed rotor 74 as discussed above. In one non-limiting embodiment, the plates 100 are secured to the opposite sides of the main body portion 92 via bolts 102 that pass through openings in the plates 100 and the main body portion 92. The bolts 102 are in one non-limiting embodiment, secured to the main body portion 92 via complementary nuts 104 that engage threads of the bolts 102. Of course, other equivalent fasteners may be used to secure the plates 100 to the main body portion 92 and various embodiments of the present disclosure are not specifically limited to the use of bolts 102 for securement of the plates 100 to the main body portion 92. For example, non-limiting embodiments of suitable fasteners include but are not limited to rivets, welds or any other types of fasteners.

By providing the "T" shaped tip portion 98 an edge 106 of the plates 100 is configured to contact a surface 108 of the end portion 96. This helps to limit movement of the plates in the direction of arrow 110 due to centrifugal forces in the direction of arrow 110 as the rotor module 70 is rotated about axis "O". As such and in one embodiment, the "T" shaped tip portion 98 is intended to carry all the centrifugal load of the plates 100, in order to avoid loading the bolts 102 in shear and the bolts 102 are only included to provide clamp force. Alternatively and in another embodiment, the plates 100 when clamped to the "T" shaped tip portion 98 may be slightly spaced from the surface 108 of the end portion 96.

In addition and as illustrated in the attached FIGS., a length "L" of the counter weight 82, 84 may also vary in order to manipulate or vary the weight and pull of first counter weight group 78 and/or the second counter weight group 80.

By providing counter weights 82, 84 with adjustable weights different blades of varying sizes and weights can be tested by simply modifying the size and weight of the plates 100 of the counter weights 82, 84. This reduces the associated costs of the rotor module 70 and reduces the lead time required for testing.

As such and by providing a counter weight 82, 84 that has a "T" shaped tip 98 and bolt holes to facilitate fastening plates 100 to adjust the mass of the counter weight 82, 84, the weight of the counter weight 82, 84 can now be adjusted to offset different blades without making new counter weight bodies. As mentioned above, bolts 102 are used to clamp the plates 100 to the main body portion 92 and the "T" shaped portion 98 supports the centrifugal load of the plates 100.

Figure 4:
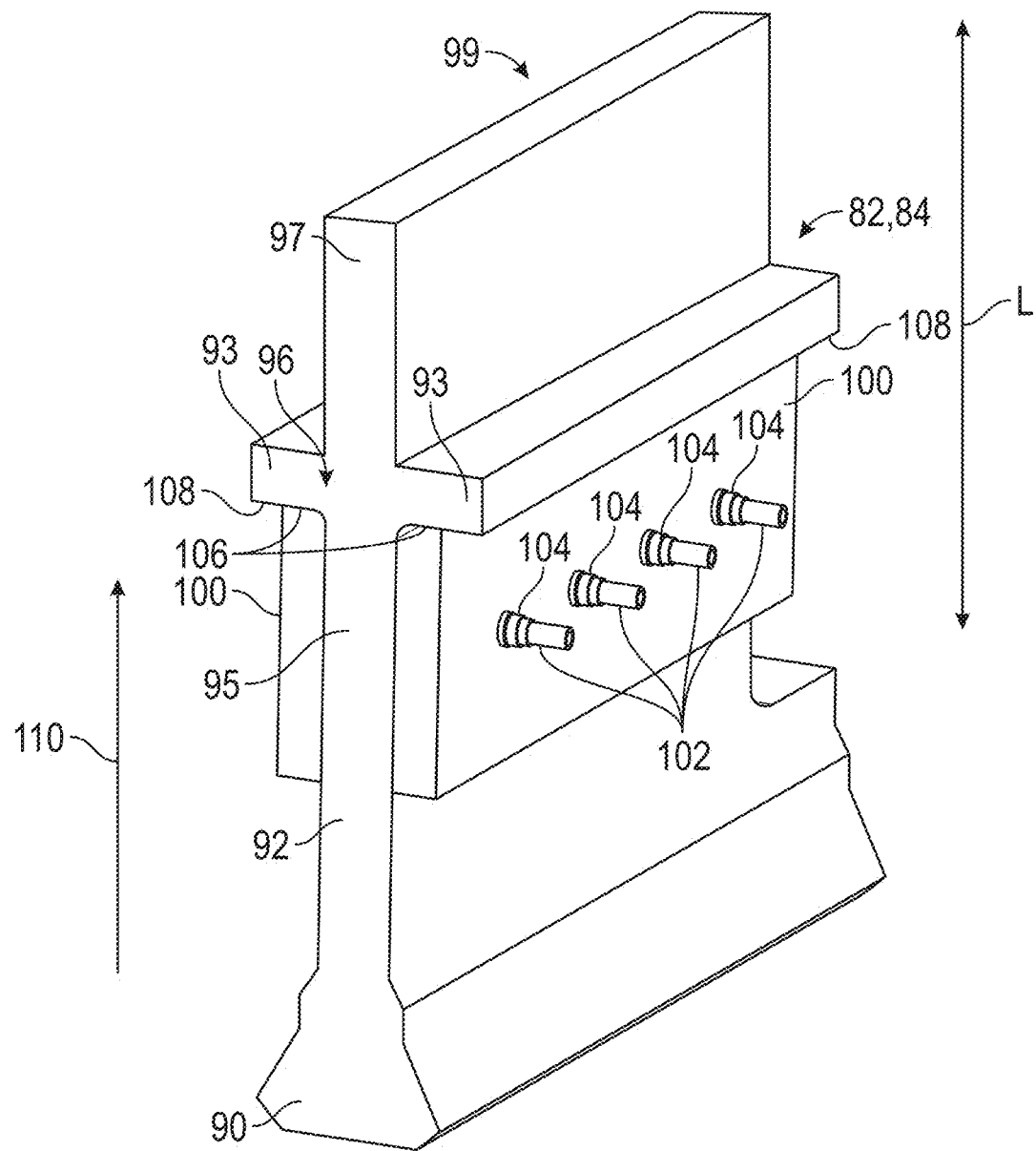
FIG. 4 is a perspective view of a counter weight in accordance another embodiment of the present disclosure.

Referring now to FIG. 4 and in an alternative embodiment, the counter weight 82, 84 is configured such that the pair of side portions 93 do not extend from the end portion 96 but from a portion of the main body portion 92 such that the main body portion 92 has a lower portion 95 located below the pair of side portions 93 and an upper portion 97 located above the pair of side portions 93.

In one non-limiting embodiment, the counter weights 82, 84 are formed as a single unitary item wherein the root portion 90, the main body portion 92 and the side portions 93 are all formed as a single unitary item or monolithic structure.

This configuration also allows for plates 100 to be secured to opposite sides of the main body portion 92 in order to adjust the weight of the counter weight 82, 84 as needed in order to provide the zero nominal imbalance as well as the axi-symmetrical moment of inertia for the partially bladed rotor 74 as discussed above. In one non-limiting embodiment, the plates 100 are secured to the opposite sides of the main body portion 92 via bolts 102 that pass through openings in the plates 100 and the main body portion 92. The bolts 102 are in one non-limiting embodiment, secured to the main body portion 92 via complementary nuts 104 that engage threads of the bolts 102. Of course, other equivalent fasteners may be used to secure the plates 100 to the main body portion 92 and various embodiments of the present disclosure are not specifically limited to the use of bolts 102 for securement of the plates 100 to the main body portion 92. For example, non-limiting embodiments of suitable fasteners include but are not limited to rivets, welds or any other types of fasteners.

By providing the laterally extending side portions 93 an edge 106 of the plates 100 is configured to contact a surface 108 of the side portions 93. This helps to limit movement of the plates in the direction of arrow 110 due to centrifugal forces in the direction of arrow 110 as the rotor module 70 is rotated about axis "O". As such and in one embodiment, the side portions 93 are intended to carry all the centrifugal load of the plates 100, in order to avoid loading the bolts 102 in shear and the bolts 102 are only included to provide clamp force. Alternatively and in another embodiment, the plates 100 when clamped to main body portion may be slightly spaced from the surface 108 of the side portions 93.

In addition and as illustrated in the attached FIGS., a length "L" of the counter weight 82, 84 may also vary in order to manipulate or vary the weight and pull of first counter weight group 78 and/or the second counter weight group 80.

By providing counter weights 82, 84 with adjustable weights different blades of varying sizes and weights can be tested by simply modifying the size and weight of the plates 100 of the counter weights 82, 84. This reduces the associated costs of the rotor module 70 and reduces the lead time required for testing.

As such and by providing a counter weight 82, 84 that has side portions 93 and bolt holes to facilitate fastening plates 100 to adjust the mass of the counter weight 82, 84, the weight of the counter weight 82, 84 can now be adjusted to offset different blades without making new counter weight bodies. As mentioned above, bolts 102 are used to clamp the plates 100 to the main body portion 92 and the side portions 93 support the centrifugal load of the plates 100.

Figure 5:
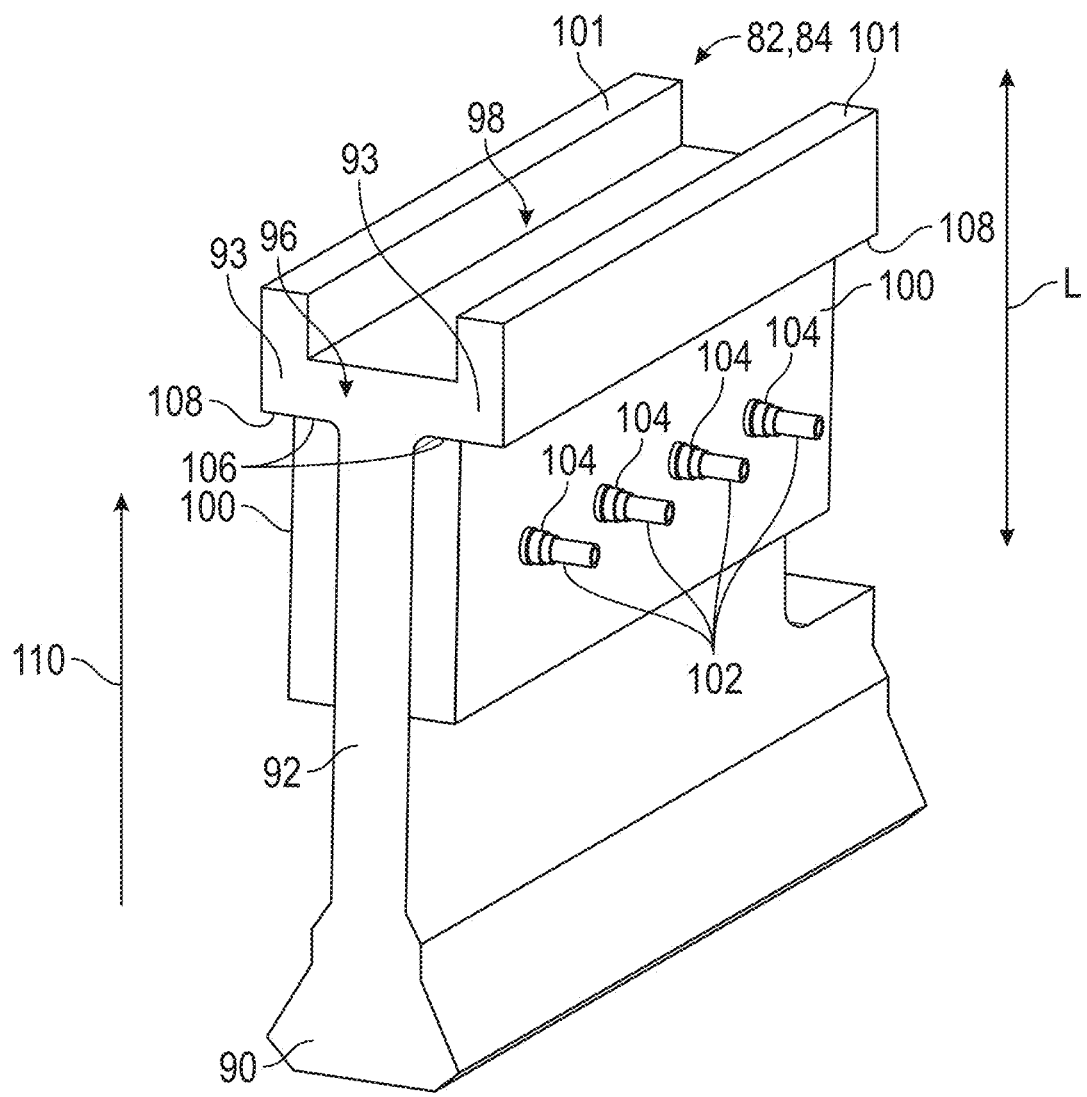
FIG. 5 is a perspective view of a counter weight in accordance another embodiment of the present disclosure.

Referring now to FIG. 5, yet another alternative embodiment of the present disclosure is illustrated. Here the pair of side portions 93 include sacrificial side portions 101 that extend either axially up and/or down and/or radially away from the side portions 93. These sacrificial side portions 101 add additional weight to the counter weights 82, 84 which can be varied by removing (e.g., by cutting or milling) a portion of the sacrificial side portions 101 from the counter weights 82, 84. This embodiment can be used in combination with plate(s) 100 or in lieu of plates 100.

In one non-limiting embodiment, the counter weights 82, 84 are formed as a single unitary item wherein the root portion 90, the main body portion 92 and the side portions and the sacrificial side portions 101 are all formed as a single unitary item or monolithic structure.

This configuration also allows for plates 100 to be secured to opposite sides of the main body portion 92 in order to adjust the weight of the counter weight 82, 84 as needed in order to provide the zero nominal imbalance as well as the axi-symmetrical moment of inertia for the partially bladed rotor 74 as discussed above. In one non-limiting embodiment, the plates 100 are secured to the opposite sides of the main body portion 92 via bolts 102 that pass through openings in the plates 100 and the main body portion 92. The bolts 102 are in one non-limiting embodiment, secured to the main body portion 92 via complementary nuts 104 that engage threads of the bolts 102. Of course, other equivalent fasteners may be used to secure the plates 100 to the main body portion 92 and various embodiments of the present disclosure are not specifically limited to the use of bolts 102 for securement of the plates 100 to the main body portion 92. For example, non-limiting embodiments of suitable fasteners include but are not limited to rivets, welds or any other types of fasteners.

By providing the laterally extending side portions 93 an edge 106 of the plates 100 is configured to contact a surface 108 of the side portions 93. This helps to limit movement of the plates in the direction of arrow 110 due to centrifugal forces in the direction of arrow 110 as the rotor module 70 is rotated about axis "O". As such and in one embodiment, the side portions 93 are intended to carry all the centrifugal load of the plates 100, in order to avoid loading the bolts 102 in shear and the bolts 102 are only included to provide clamp force. Alternatively and in another embodiment, the plates 100 when clamped to main body portion may be slightly spaced from the surface 108 of the side portions 93.

In addition and as illustrated in the attached FIGS., a length "L" of the counter weight 82, 84 may also vary in order to manipulate or vary the weight and pull of first counter weight group 78 and/or the second counter weight group 80.

By providing counter weights 82, 84 with adjustable weights different blades of varying sizes and weights can be tested by simply modifying the size and weight of the plates 100 of the counter weights 82, 84. This reduces the associated costs of the rotor module 70 and reduces the lead time required for testing.

As such and by providing a counter weight 82, 84 that has side portions 93 and bolt holes to facilitate fastening plates 100 to adjust the mass of the counter weight 82, 84, the weight of the counter weight 82, 84 can now be adjusted to offset different blades without making new counter weight bodies. As mentioned above, bolts 102 are used to clamp the plates 100 to the main body portion 92 and the side portions 93 support the centrifugal load of the plates 100.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A counter weight for use with a rotor module, comprising:
    a root portion;
    a main body portion that extends away from the root portion;
    a pair of side portions each extending laterally away from opposite sides of the main body portion such that the counter weight is configured to have a "T" shaped tip portion; and
    at least one plate secured to one of the opposite sides of the main body portion in order to adjust a weight of the counter weight.

2. The counter weight as in claim 1, wherein the at least one plate is a pair of plates secured to the opposite sides of the main body portion via bolts that pass through openings in the pair of plates and the main body portion.

3. The counter weight as in claim 2, wherein an edge of the pair of plates contacts a surface of the pair of side portions when they are secured to the main body portion.

4. The counter weight as in claim 3, wherein the root portion, the main body portion and the pair of side portions are all formed as a single unitary item or monolithic structure.

5. The counter weight as in claim 1, wherein an edge of the at least one plate contacts a surface of one of the pair of side portions when it is secured to the main body portion.

6. The counter weight as in claim 1, wherein the pair of side portions extend from an end portion of the main body portion.

7. A rotor module, comprising:
    a blade cluster of a plurality of blades secured to a rotor disk of the rotor module; and
    counter weights secured to the rotor disk, wherein a center of gravity of the plurality of blades is zeroed out with respect to an axis "O" of the rotor disk and the rotor module further comprises an "X" axis and a "Y" axis each orthogonally arranged with respect to the axis "O" of the rotor disk and wherein the blade cluster and the counter weights are configured to provide a configuration with respect to the axis "O" of the rotor disk and a moment of inertia Jx about the X axis is equal to a moment of inertia Jy about the Y axis when the rotor module is rotated about the axis "O" of the rotor disk, wherein each counter weight of the counter weights includes:
    a root portion;
    a main body portion that extends away from the root portion;
    a pair of side portions each extending laterally away from opposite sides of the main body portion such that each counter weight of the counter weights is configured to have a "T" shaped tip portion; and
    at least one plate secured to one of the opposite sides of the main body portion in order to adjust a weight of the counter weight.

8. The rotor module as in claim 7, wherein the counter weights is a pair of counter weights and the pair of counter weights include a first counter weight group and a second counter weight group.

9. The rotor module as in claim 8, wherein the first counter weight group comprises a pair of counter weights and the second counter weight group comprises a pair of counter weights.

10. The rotor module as in claim 9, wherein the pair of counter weights of the first counter weight group are of different weights and the pair of counter weights and the second counter weight group are of different weights.

11. The rotor module as in claim 7, wherein a center of gravity of the blade cluster is designated at a twelve clock position with respect to the axis "O" and one of the counter weights is at a four clock position with respect to the axis "O" and the another one of the counter weights is at an eight clock position with respect to the axis "O".

12. The rotor module as in claim 11, wherein the counter weights include a first counter weight group and a second counter weight group and the first counter weight group comprises a pair of counter weights and the second counter weight group comprises a pair of counter weights.

13. The rotor module as in claim 7, wherein the plurality of blades are fan blades.

14. The rotor module as in claim 13, wherein the plurality of blades are three fan blades.

15. The rotor module as in claim 7, wherein the at least one plate is a pair of plates secured to opposite sides of the main body portion via bolts that pass through openings in the pair of plates and the main body portion.

16. The rotor module as in claim 7, wherein an edge of the at least one plate contacts a surface of one of the pair of side portions when they are secured to the main body portion.

17. The rotor module as in claim 7, wherein the root portion, the main body portion and the pair of side portions are all formed as a single unitary item or monolithic structure.

18. The rotor module as in claim 7, wherein the pair of side portions includes a sacrificial side portion.

19. The rotor module as in claim 18, wherein the sacrificial side portion extends radially from the pair of side portions.

20. A method for zeroing out a center of gravity of a plurality of blades with respect to an axis "O" of a rotor disk the plurality of blades are secured to, comprising:
    securing a blade cluster of the plurality of blades to the rotor disk; and
    securing counter weights to the rotor disk, wherein the center of gravity of the plurality of blades is zeroed out with respect to the axis "O" of the rotor disk and the rotor disk further comprises an "X" axis and a "Y" axis each orthogonally arranged with respect to the axis "O" of the rotor disk and wherein the blade cluster and the counter weights are configured to provide a configuration with respect to the axis "O" of the rotor disk and a moment of inertia Jx about the X axis is equal to a moment of inertia Jy about the Y axis when the rotor disk is rotated about the axis "O" of the rotor disk, wherein each counter weight of the counter weights includes:
    a root portion;
    a main body portion that extends away from the root portion;
    a pair of side portions each extending laterally away from opposite sides of the main body portion such that each counter weight of the counter weights is configured to have a "T" shaped tip portion; and
    at least one plate secured to one of the opposite sides of the main body portion in order to adjust a weight of the counter weight.

* * * * *